US006152382A

United States Patent [19]

Pun

[11] Patent Number: 6,152,382

[45] Date of Patent: Nov. 28, 2000

[54] MODULAR SPRAY UNIT AND METHOD FOR CONTROLLED DROPLET ATOMIZATION AND CONTROLLED PROJECTION OF DROPLETS

[76] Inventor: John Y. Pun, 1641 Hillgrade Ct., Coos Bay, Oreg. 97420

[21] Appl. No.: 09/231,455

[22] Filed: Jan. 14, 1999

[51] Int. Cl.$^{7}$ ..................... B05B 3/02

[52] U.S. Cl. ..................... 239/77; 239/7; 239/11; 239/78; 239/214.17; 239/214.21; 239/224

[58] Field of Search ..................... 239/77, 78, 214, 239/214.11, 214.17, 214.21, 223, 224, 11

[56] References Cited

U.S. PATENT DOCUMENTS

| | | | |
|---|---|---|---|
| 1,327,256 | 1/1920 | Scheminger . | |
| 2,087,627 | 7/1937 | Nyrop | 299/63 |
| 2,220,275 | 11/1940 | Preston | 299/63 |
| 2,674,494 | 4/1954 | Matteson et al. | 239/78 |
| 3,148,832 | 9/1964 | Point | 239/15 |
| 3,192,167 | 6/1965 | Ogawa et al. | 239/223 X |
| 3,206,177 | 9/1965 | Caplow | 261/30 |
| 3,448,926 | 6/1969 | Knowles | 239/77 |
| 3,552,652 | 1/1971 | Greenwood | 239/77 |
| 3,903,715 | 9/1975 | Plotz | 68/205 R |
| 3,963,178 | 6/1976 | Collins | 239/77 X |
| 4,225,084 | 9/1980 | Mals | 239/223 |
| 4,251,031 | 2/1981 | Martin | 239/102 |
| 4,337,896 | 7/1982 | Berger | 239/102 |
| 4,429,833 | 2/1984 | Meisner | 239/224 |
| 4,458,844 | 7/1984 | Mitsui | 239/703 |
| 4,502,634 | 3/1985 | Bals | 239/223 |
| 4,516,723 | 5/1985 | Hesse | 239/77 |
| 4,540,124 | 9/1985 | Haruch | 239/223 |
| 4,609,145 | 9/1986 | Miller | 239/77 |
| 4,619,401 | 10/1986 | Hardman | 239/214.17 |
| 4,659,013 | 4/1987 | Ledebuhr | 239/8 |
| 4,784,332 | 11/1988 | Takeuchi | 239/703 |
| 4,795,095 | 1/1989 | Shepard | 239/214.17 |
| 4,796,807 | 1/1989 | Bendig | 239/102.2 |
| 4,815,661 | 3/1989 | Anthony | 239/102.2 |
| 5,037,029 | 8/1991 | Garet | 239/77 |
| 5,373,990 | 12/1994 | Ballu | 239/77 |
| 5,667,733 | 9/1997 | Waldron, Sr. | 239/77 X |
| 5,921,019 | 7/1999 | Baek | 239/77 X |

*Primary Examiner*—Andres Kashnikow
*Assistant Examiner*—Robin O. Evans
*Attorney, Agent, or Firm*—Stephen E. Baldwin

[57] ABSTRACT

The present invention relates to an apparatus and method for controlled droplet atomization and controlled projection of atomization droplets. More particularly, the present invention is a spray apparatus that produces uniform sized atomized droplets controllable from fog size to larger for spraying fungicides, bactericides, pesticides, insecticides, plant nutrients and other materials applied to crop, ground, and foliage for agricultural and horticultural benefaction. The apparatus generates laminar airflow in a vortex or cyclone pattern functioning to project and distribute spray droplets evenly and more completely on the sprayed surfaces. The resulting vortex or cyclone spray and airflow serves to lift, turn, and flutter plant leaves, exposing all sides to be coated with spray droplets.

12 Claims, 13 Drawing Sheets

MODULAR SPRAY UNIT AND METHOD FOR CONTROLLED DROPLET ATOMIZATION AND CONTROLLED PROJECTION OF DROPLETS

BACKGROUND OF INVENTION

The present invention relates to an apparatus and method for controlled droplet atomization and controlled projection of atomization droplets.

Rotary atomizer technology has long existed. Modified rotating disks for atomizing are exemplified by prior art U.S. Pat. Nos. 1,327,256; 2,220,275; and 3,206,177. Rotating cups and cones are employed in U.S. Pat. Nos. 3,552,652; 4,429,833; 4,540,634; 4,540,124; 4,609,145; 4,619,401 and 4,795,095. Rotating cylinders with perforations and cylindrical screens have been described in U.S. Pat. No. 4,609,145; 4,659,013; and 5,037,029. In the prior art, all atomizing rotating members regardless of shape generate droplets travelling perpendicularly to the rotating member and generally not in the direction the droplets to be projected.

Powerful fans and blowers are required to project the atomized droplets to intended targets. This requirement necessitates the atomizer(s) and fan be located near the power source. Since power sources employed in the prior art are mechanical power trains linked to the engine of towing or driving vehicle, the droplets must travel a long distance to the target plants. Turbulent airflow, gravity, and air resistance all play a part in previous prior arts not being able to achieve good spray coverage while producing enormous waste of chemicals and contamination of environment.

In view of the foregoing, it would be desirable to provide an improved spray unit for controlled droplet atomization and controlled projection of droplets.

SUMMARY OF THE INVENTION

The present invention provides an apparatus and method for controlled droplet atomization and controlled projection of atomization droplets.

More particularly, the present invention is a spray apparatus that produces uniform sized atomized droplets controllable from fog size to larger for spraying fungicides, bactericides, pesticides, insecticides, plant nutrients and other materials applied to crop, ground, and foliage for agricultural and horticultural benefaction.

The apparatus generates laminar airflow in a vortex or cyclone pattern functioning to project and distribute spray droplets evenly and more completely on the sprayed surfaces. The resulting vortex or cyclone spray and airflow serves to lift, turn, and flutter plant leaves, exposing all sides to be coated with spray droplets.

In one preferred embodiment, the present invention provides a modular spray apparatus comprised of an integrated system of airflow generated by an axial fan; a rotary cone shaped atomizer and two sets of multi-layer air channels. These components interact to perform functions of droplet atomization, modifying droplet travel direction, and attenuate droplet acceleration resulting in a controlled vortex or spiral pattern of atomized droplets and airflow. The fan motor and atomizer are electrically powered forming the basis for a lightweight spray module. Multiple modules are mounted on specifically designed booms to accommodate virtually all plant profiles. One object is to be able to place the sprayer module very close to the plant(s) reducing significantly the distance droplets must travel to reach intended targets. Great reduction of the distance droplets travel makes possible large reduction of power requirement and size of the blower or fan. This arrangement allows far greater number of droplets to reach the intended target providing more complete spray coverage with minimum loss of spray chemicals to the environment.

An important aspect of this invention is the use of laminar airflow (unidirectional traveling of all air molecules) that provides a force vector to move droplets forward, imparting kinetic energy to accelerate the droplets in a predictable direction, and provides a controlled airflow and spray pattern for deposition of atomized droplets to all surfaces of plant leaves.

Other objects, features and advantages of the present invention will become apparent from the following detailed description when taken in conjunction with the accompanying drawings.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 also shows the preferred position of the atomizer cone in relation to the spray unit's cylindrical casing.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

As described above, the present invention provides an apparatus and method for controlled droplet atomization and controlled projection of atomization droplets. More particularly, the present invention is a spray apparatus that produces uniform sized atomized droplets controllable from fog size to larger for spraying fungicides, bactericides, pesticides, insecticides, plant nutrients and other materials applied to crop, ground, and foliage for agricultural and horticultural benefaction.

The apparatus generates laminar airflow in a vortex or cyclone pattern functioning to project and distribute spray droplets evenly and more completely on the sprayed surfaces. The resulting vortex or cyclone spray and airflow serves to lift, turn, and flutter plant leaves, exposing all sides to be coated with spray droplets.

In one preferred embodiment, the present invention provides a modular spray apparatus comprised of an integrated system of airflow generated by an axial fan; a rotary cone shaped atomizer and two sets of multi-layer air channels. These components interact to perform functions of droplet atomization, modifying droplet travel direction, and attenuate droplet acceleration resulting in a controlled vortex or spiral pattern of atomized droplets and airflow. The fan motor and atomizer are electrically powered forming the basis for a lightweight spray module. Multiple modules are mounted on specifically designed booms to accommodate virtually all plant profiles. One object is to be able to place the sprayer module very close to the plant(s) reducing significantly the distance droplets must travel to reach intended targets. Great reduction of the distance droplets travel makes possible large reduction of power requirement and size of the blower or fan. This arrangement allows far greater number of droplets to reach the intended target providing more complete spray coverage with minimum loss of spray chemicals to the environment.

An important aspect of this invention is the use of laminar airflow (unidirectional travelling of all air molecules) that provides a force vector to move droplets forward, imparting kinetic energy to accelerate the droplets in a predictable direction, and provides a controlled airflow and spray pattern for deposition of atomized droplets to all surfaces of plant leaves.

Figure 1:
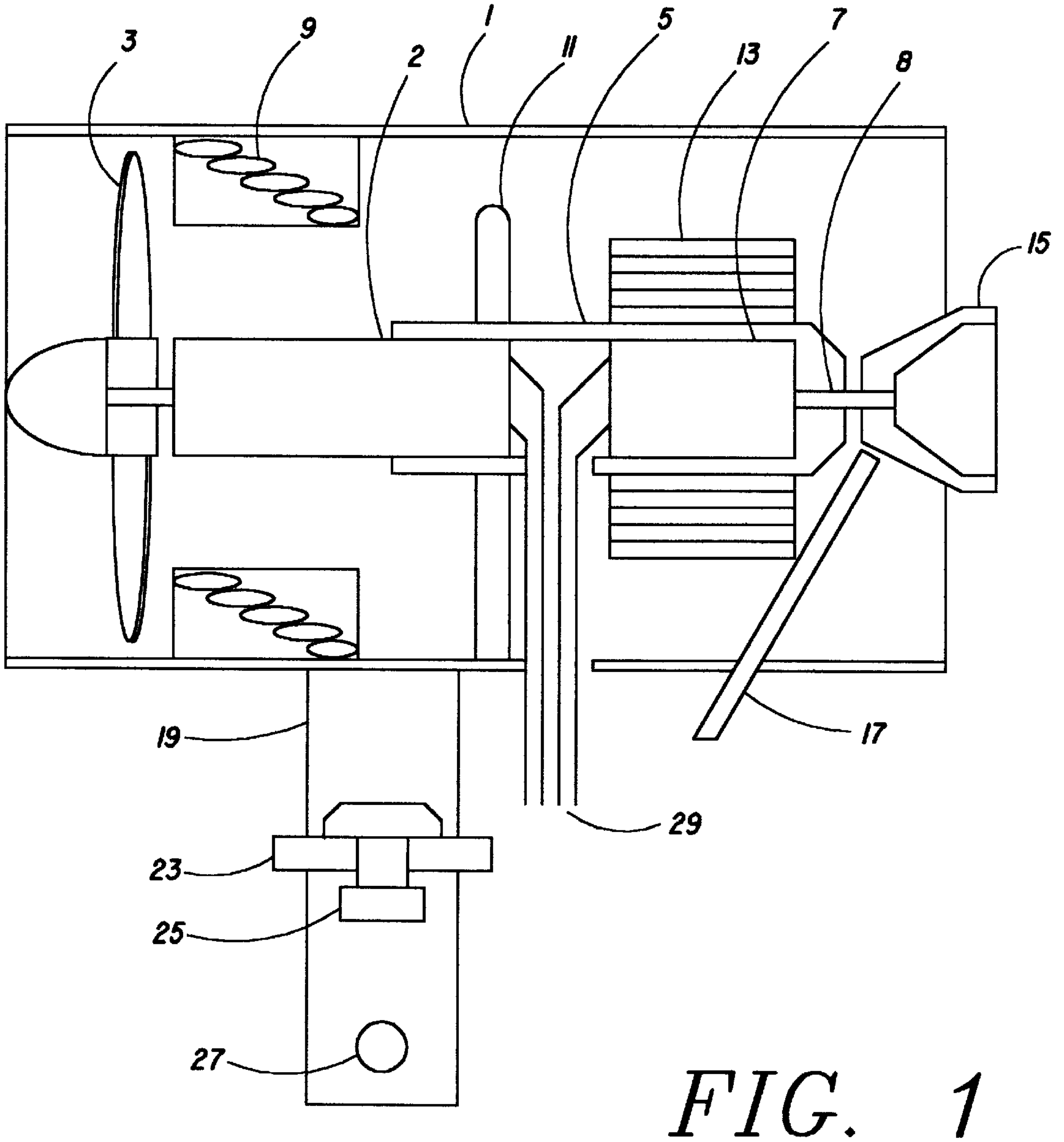
FIG. 1 is a full cross section elevation view of a spray unit for controlled droplet atomizer in accordance with the present invention indicating the spatial relationships of components such as axial fan, tangential air channels, fan motor, parallel air channels (in relation to the atomizer axis) atomizer motor, atomizer cone and conduit for fluid delivery.
Figure 1A:
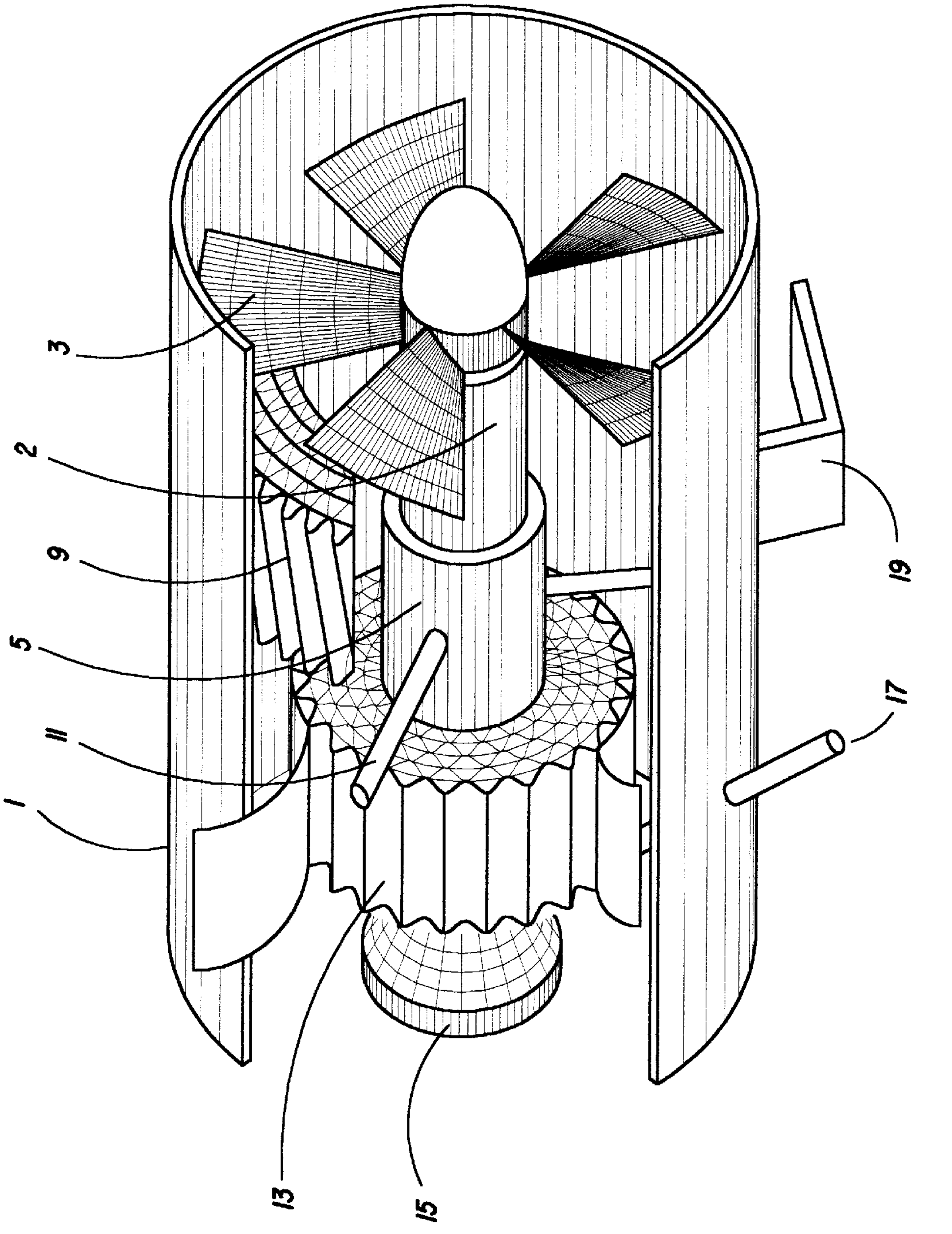
FIG. 1*a* is a perspective view of the spray unit with a section of the cylindrical casing removed and outer cover of the parallel air channel partially peeled back to demonstrate the construction and directions of air flow of tangential and parallel air channels in generation of laminar air flow.
Figure 2:
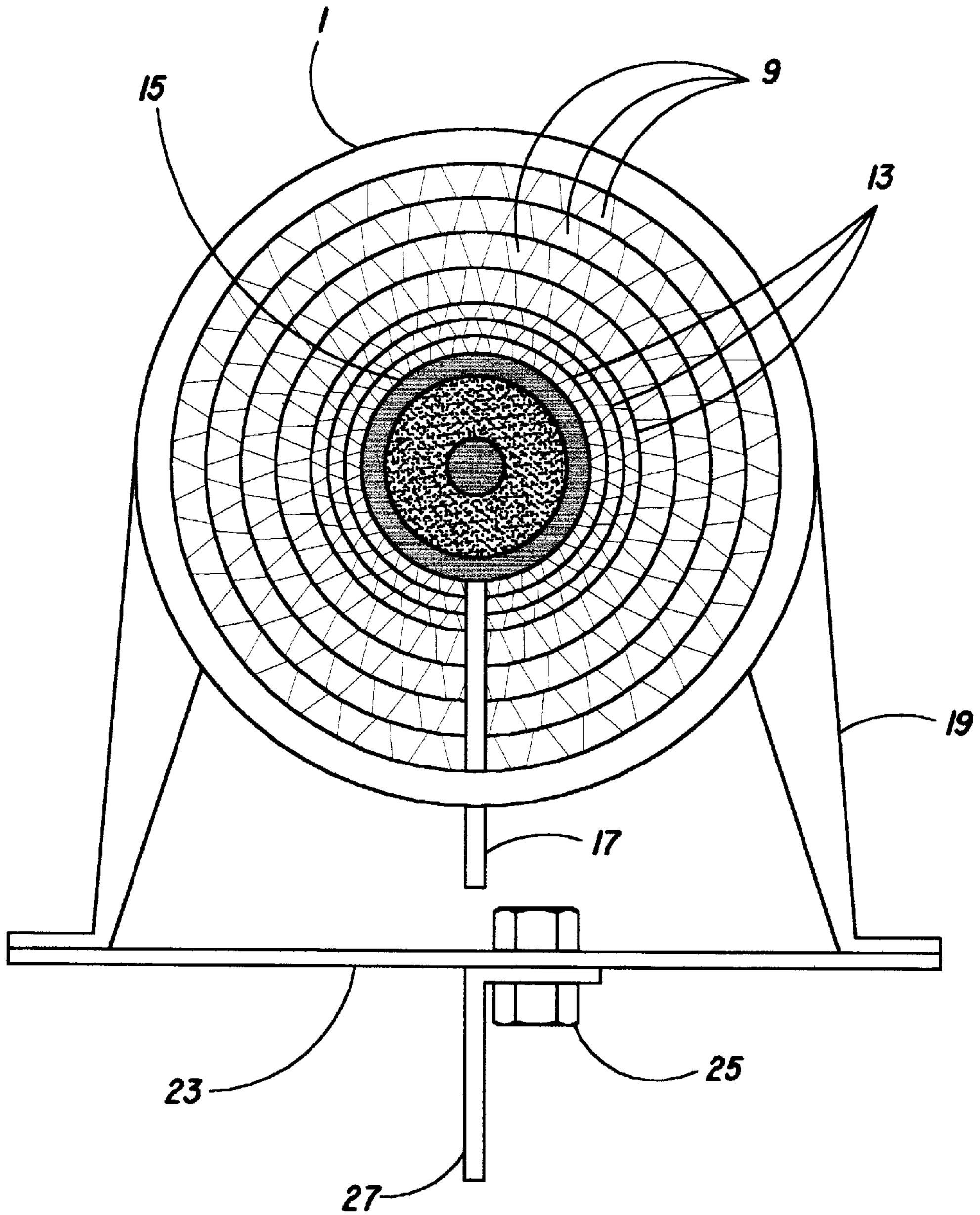
FIG. 2 is a front-end elevation view of the spray unit displaying the possible extent of air channels for generation of complete laminar airflow in relationship to the atomizer cone.

Referring now to the drawings and with specificity to the FIGS. 1, 1*a* and 2, a spray unit 30 in accord with the present invention is shown. The spray unit 30 includes a high velocity axial fan 3 or blower powered by electric motor 2 which is mounted in support tube 5 which is also supporting controlled droplet atomizer electric motor 7.

Figure 5:
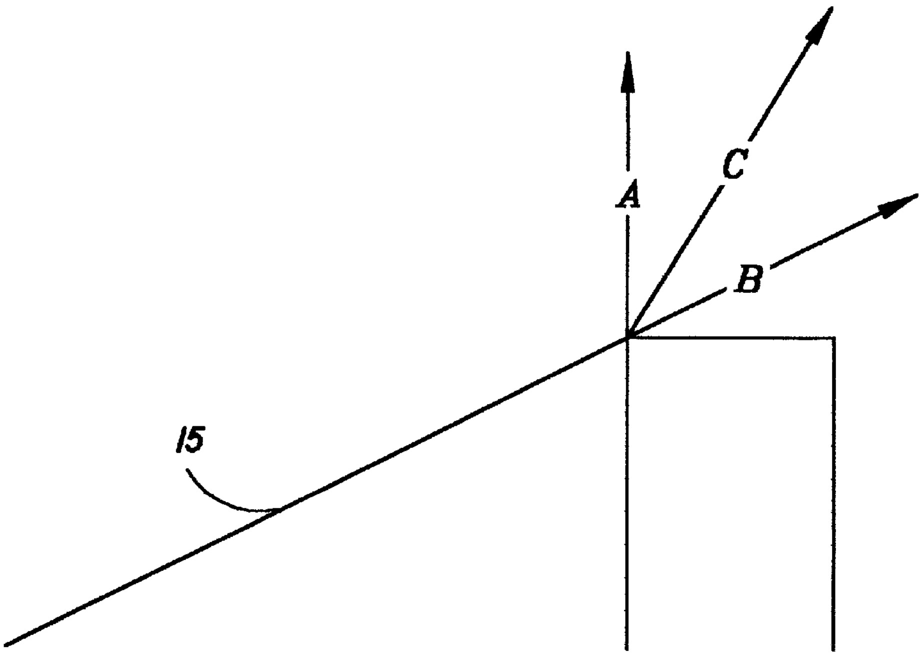
FIG. 5 is a schematic diagram of force vectors involved in formation and propelling atomized droplets by airflow and centrifugal force developed by the atomizing cone.
Figure 6:
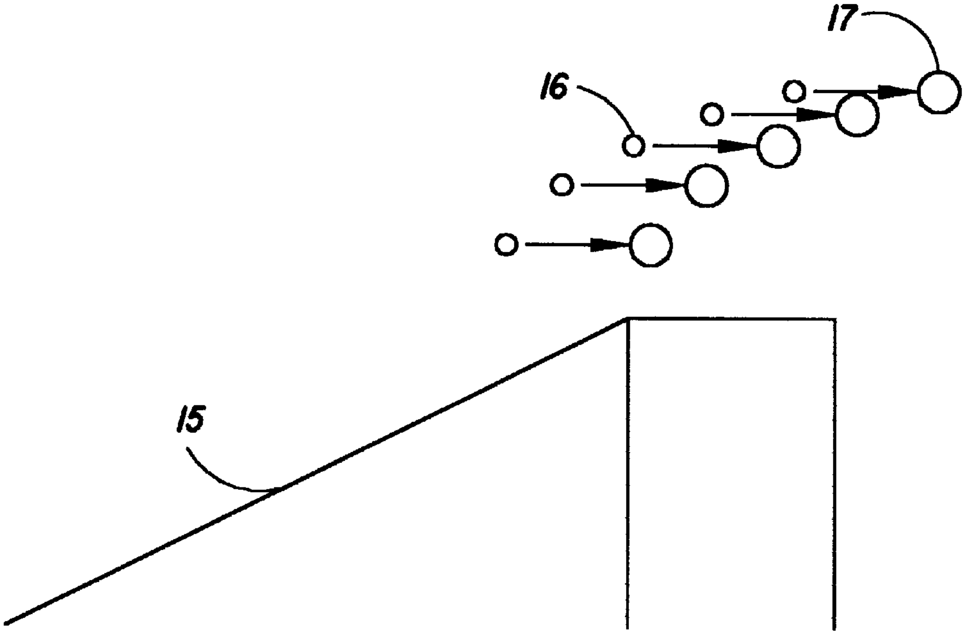
FIG. 6 is schematic diagram of air molecules colliding with atomized droplets on leaving the droplet atomizing cone and the resulting direction of travel of droplets.

A cone shaped atomizer 15 is mounted on the electric atomizer motor 7 drive shaft 8. Multi-layer air channels 13 are oriented parallel to the atomizer axis and attached to the atomizer motor housing 5. These channels 13 function to modify the more or less turbulent air generated by the axial fan 3 into a cylindrical column of coherent laminar air molecules flowing over the motorized rotating atomizer cone 15 to produce a thin fluid film (fluid delivered to the narrower base of the cone via supply tubing 17) conforming to the shape of the cone 15 and forcing the fluid film to the area of abrupt angle change of the cone 15. This thin fluid film with its direction of travel produces a force vector B (FIG. 5) interacts with centrifugal force of the rotating atomizer cone 15 which propels the droplet being sheared off to produce a force vector A (FIG. 5) and produce a resulting force vector C (FIG. 5) which is also the direction of droplet travel coming off the atomizer cone 15.

Another function of the cylindrical column of coherent laminar air molecule is to collide with the atomized droplets to impart their kinetic energy to the droplets so that the droplets accelerate and change travelling course to move forward of the atomizer cone 15 in a less tangential direction (relative to the atomizer cone 15 axis).

Figure 7:
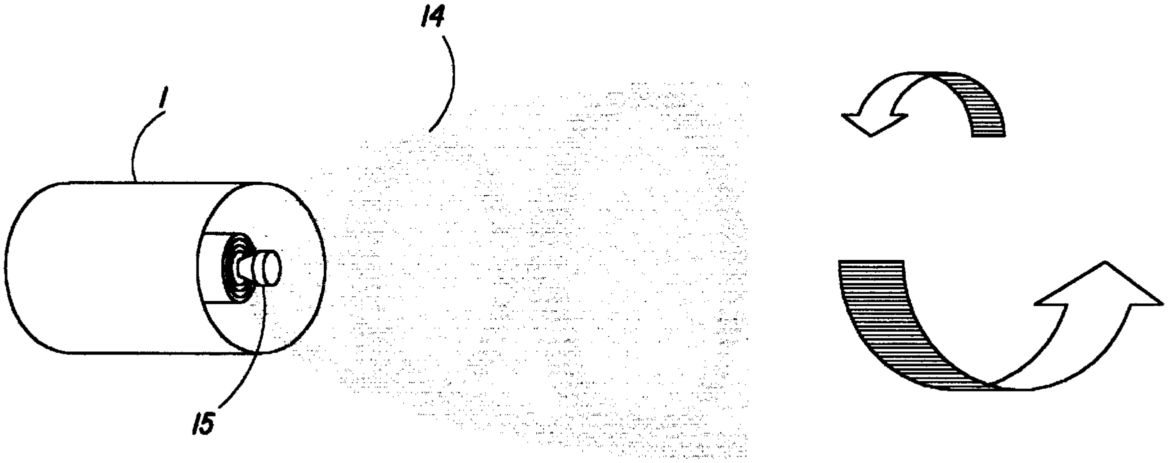
FIG. 7 is schematic diagram of a spray unit in perspective view showing controlled atomized droplets travelling in typical pattern and direction as a result of interaction of laminar airflow patterns and centrifugal force.

Referring again to drawings FIGS. 1, 1*a*, and 2, the axial fan motor and atomizer motor mounting tube 5 is attached to the wall of outer cylindrical casing 1 by means of standoffs 11. Plural layers of tangential (relative to the fan motor axis) air channels 9 are attached to the inside wall of the outer cylindrical casing 1 in the vicinity of fan motor 2 posterior to the standoffs 11. These air channels 9 funnel the somewhat spiraling airflow generated by the rotating axial fan 3 blades in more or less the same spiraling direction and convert the airflow into a spiral cylindrical column of laminar air molecules travelling in a predictable direction and degree of spiral (FIG. 7).

This resulting spiraling cylindrical column of coherent laminar air molecules also serves to impart kinetic energy to the atomized droplets for further acceleration and modifies their travelling path to a spiral 14. The spiraling atomized droplets 14 and airflow function to turn the normally hidden sides of crop leaves so droplets may cover their surfaces.

Figure 8:
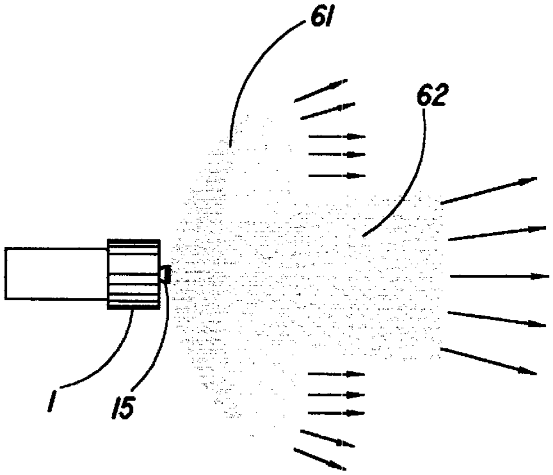
FIG. 8 is a schematic diagram of a spray unit showing the generation of a secondary atomized droplets pattern when increase of fluid input to the spray unit exceeds the system capacity that produced the primary spray pattern.

If one were to keep increasing the amount of fluid delivered to the rotating atomizer cone 15 to generate ever increasing amount of droplets, a point will be reached that many atomized droplets will not receive sufficient number of collisions with the number of air molecules to travel the prescribed path 62 (FIG. 8), a secondary atomized droplet cone 61 consisting of wide angle is generated (FIG. 8). Such wide-angle cone of atomized spray droplets 61 is of importance in case a large area is required to be covered by spray.

Figure 3:
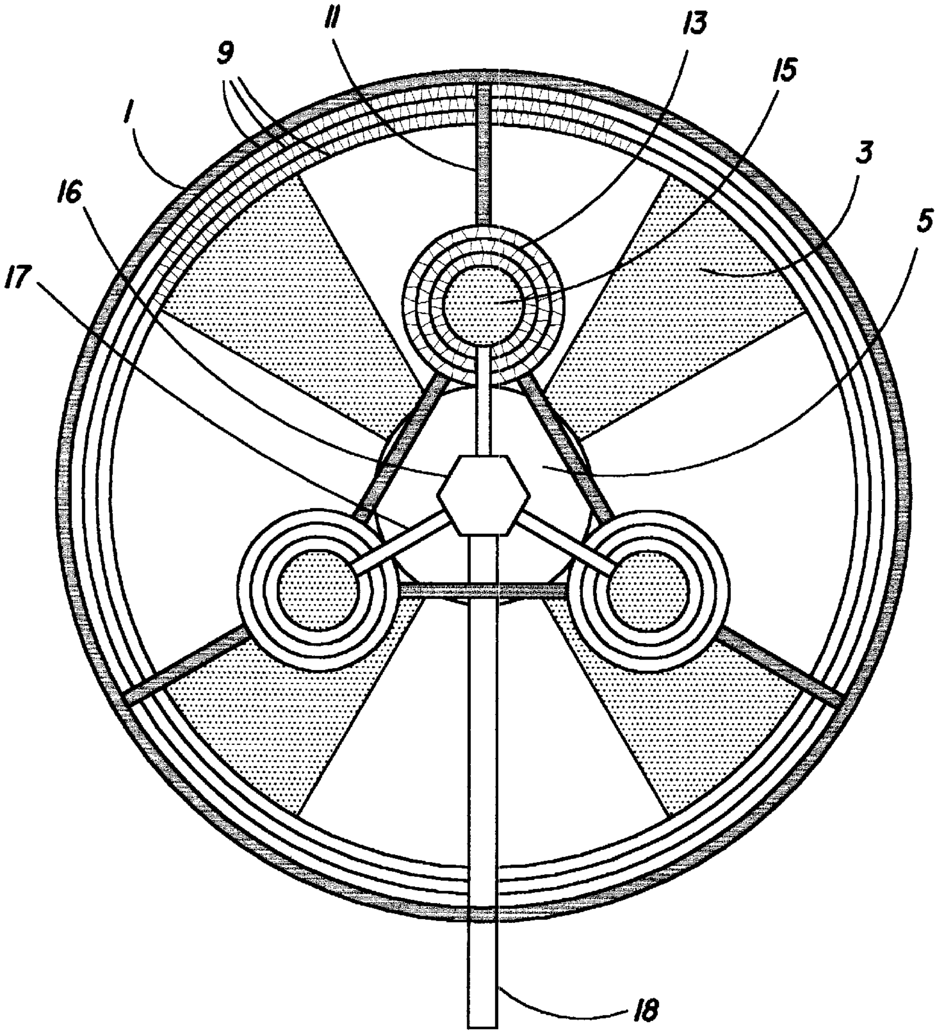
FIG. 3 is a front-end elevation of a spray unit includes a single axial fan or blower, laminar air channels, plural atomizers, and means supplying fluid to each atomizer.
Figure 4:
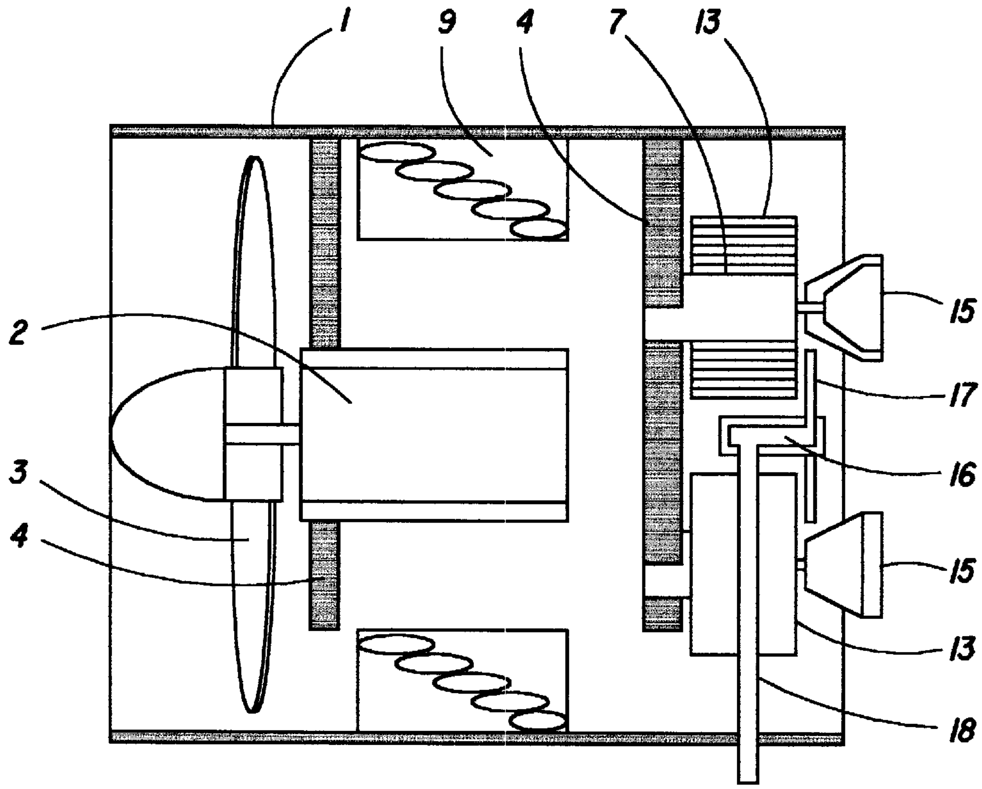
FIG. 4 is an elevation view of a spray unit as in FIG. 3 with plural controlled droplet atomizers, includes spatial relationship of axial fan or blower, laminating air channels, fluid conduits, and structural support for blower and atomizers.

Referring to the drawings and with specificity to FIG. 3 and FIG. 4, the spray unit of FIG. 1 can be constructed to include a large axial fan 3 and accommodate plural controlled droplet atomizer units (atomizer motors 7, atomizer cones 15, and parallel air channel layers 13). A support system 4 is required to space the atomizer units 7, 13, 15 a certain distance from each other and attach them to the outer casing wall 1. A fluid plenum 16 is used to convey fluid from supply line 18 to individual tubing 17 to each atomizer 7, 13, 15.

Figure 9:
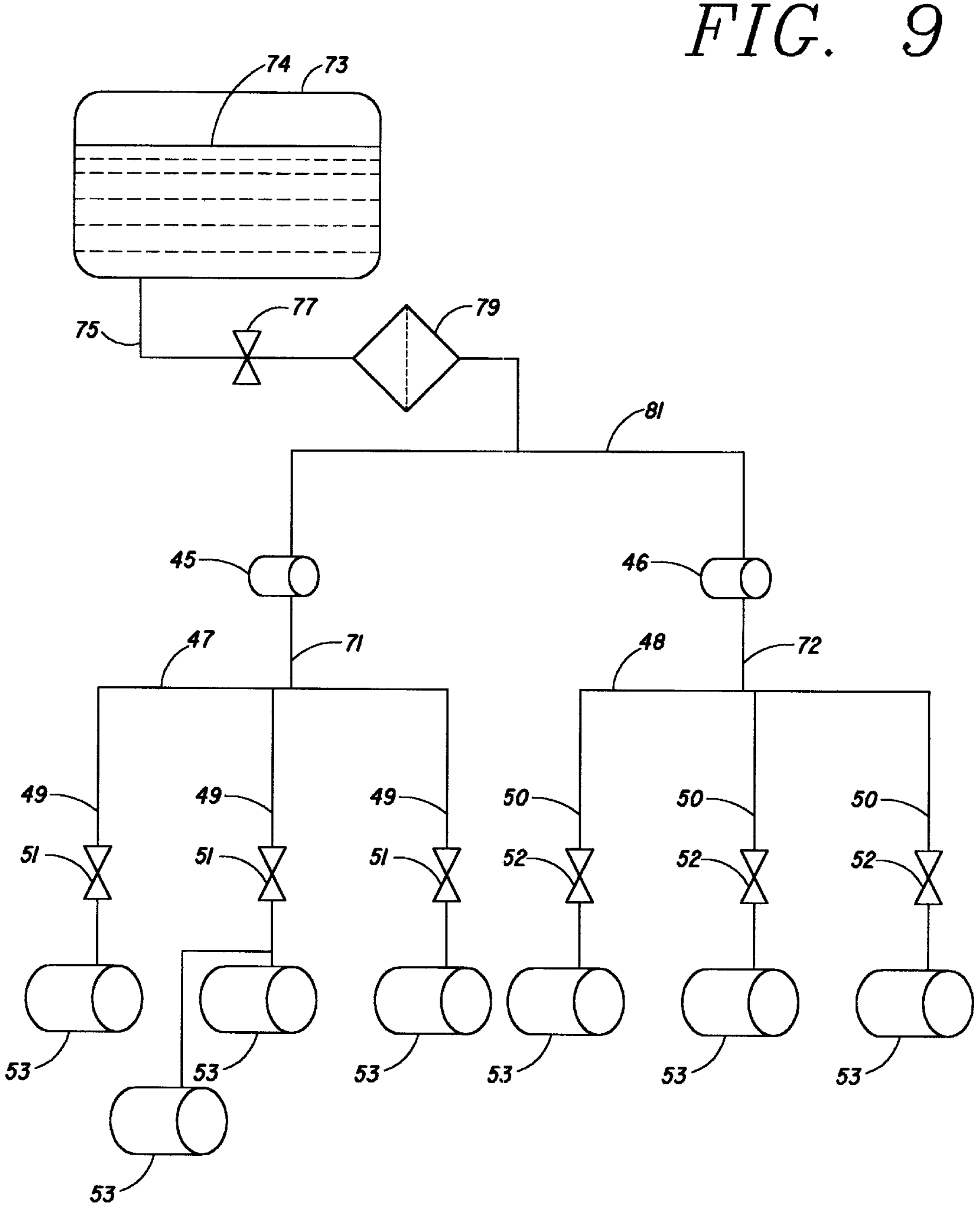
FIG. 9 is a schematic fluid circuit diagram typical of that used for delivering spray material (active ingredients and carrier with diluent or additives) to controlled droplet atomizer of an agricultural sprayer.

A fluid circuit supplying plural sprayer units as in the case of agricultural sprayers is depicted in FIG. 9. Spray material 74 in tank 73 is transported through conduit 75 through a valve 77 to a filter 79. The filtered spray material is transported through conduit 81 to plural pumps 45 (left side) and 46 right side.

The left side pump 45 supplies spray material through conduits 71, to branch conduits 47, 49 to individual valves 51 supplying each spray unit 53. The right side pump 46 performs the same function on the right side. While the output of the pumps on each side is identical and regulated by electronic means, individual valves 51, 52 permit the user to regulate amount of fluid delivered to each spray unit 53.

Figure 10:
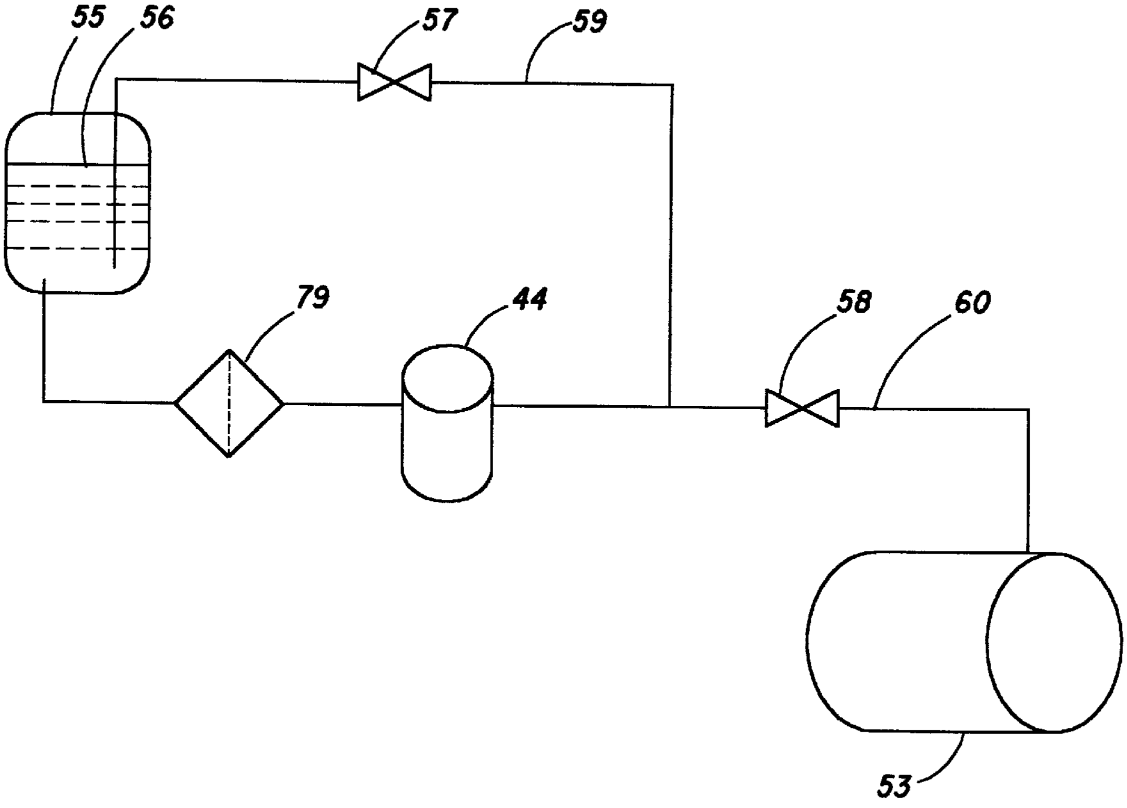
FIG. 10 is a schematic fluid circuit diagram typical of that used for delivering spray materials to simple portable sprayer.

FIG. 10 shows a simpler fluid circuit for supplying a single spray unit for use with portable sprayer. In this case the electric pump output is operating maximally. The amount of spray material delivered to the spray unit is regulated by varying the adjustments of output valve 58 and return valve 57 controlling the amount of spray material return to the reservoir 55 through conduit 59 and the amount allowed to be delivered to the spray unit 30.

Figure 11:
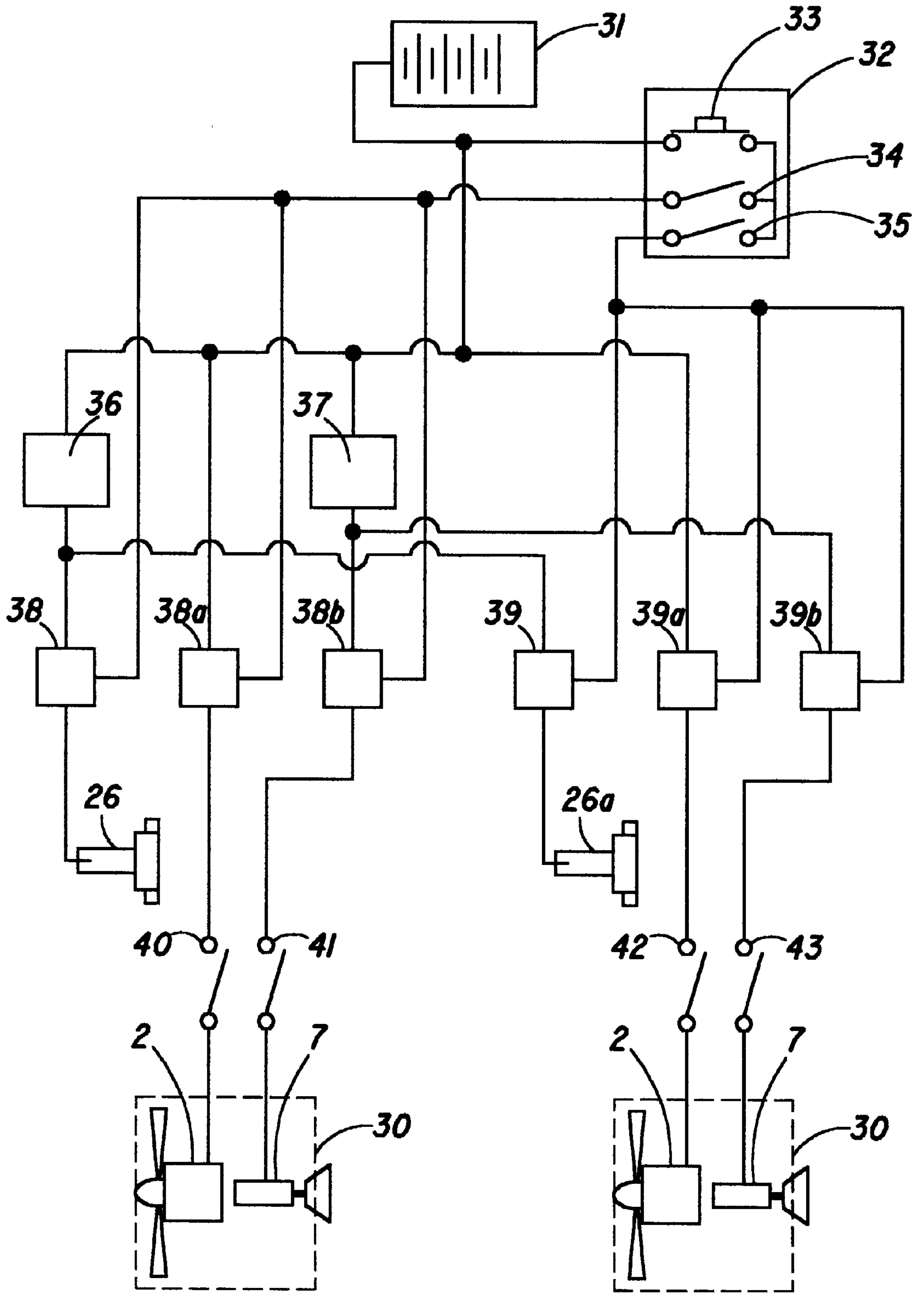
FIG. 11 is a schematic electrical and electronic diagram that describes control circuitry that includes power source, remote control left and right side spraying, pump(s) fluid output regulation, and droplet size regulation and on-off control for individual spray unit in a plural spray apparatus agricultural sprayer system.

Referring to FIG. 11, any electrical power source may operate this invention. The preferred power source is 12 volt direct current electricity 31 especially in agricultural sprayer applications. Since operation of an agricultural sprayer normally involves the use of a tractor, alternator and battery of the tractor provide a ready power source 31 for operation of this invention. The high energy efficiency of this invention also permits the use of storage batteries alone as a power source 31 doing a normal day's spraying (8 hours) before recharging.

To provide means for minimal energy expenditure as well as additional savings of spray material, the controlling circuitry is divided into left and right side. This arrangement is especially useful when starting spraying on one side of the crop-land and ending spraying on the other when only one side needs to be sprayed.

For simplicity of description, controlling circuitry for one side (left side) will be described. Electrical power from power source is directed to relay 38*a*, which in turn supplies power to switch 40 before reaching axial fan motor 2 of a spray unit 30.

To accomplish the task of controlled droplet atomization, electrical power is supplied to an electronic motor speed controller (voltage regulator) 37 which in turn supplies regulated electrical power to electrical relay 38*b*. After the switch in relay 38*b* is closed, the regulated power is directed to switch 41 before supplying atomizer motor 7 of a spray unit 30. Regulated voltage from electronic motor speed controller supplies electrical relays 38*b*, 39*b* on the left and right side. This arrangement insures all atomizer motors 7 operate with same rotational speed thereby producing same size atomized droplets.

Means of controlling spray material delivery to all spray units 30 in an agricultural sprayer involves supplying electrical power to an electronic motor speed controller (voltage regulator) 36, which in turn supplies regulated electrical power to electrical relays 38, for the left side and electrical relay 39 on the right side. Electrical power from relay 38 is used to operate a pump 26 supplying spray material to the spray unit(s) 30 on the left side, while electrical power from relay 39 is used to operate the right side pump 26*a*. The purpose of utilizing a single electronic motor speed controller to regulate electrical voltage supply to pumps 26 and 26*a* is to insure amount spray material delivered to spray units 30 on the left side and spray units 30 on the right side of the agricultural spray is the same.

Operations of left side relays 38, 38*a*, 38*b* are operated through a left side switch 34 and right side relays 39, 39*a*, 39*b* are controlled by a right side switch 35 located on a remote controller. A pushbutton switch 33 also located on the remote control 32 regulates these two switches 34, 35.

The function of the remote control 32 is to allow safe, accessible, and easy control of entire spraying operation close to the sprayer and tractor (or other towing vehicle) operator once the all functional controls (electronic motor speed controllers 36, 37, switches 40, 41, 42, 43, remote controller switches 34 and 35) are set.

Conforming to the spirit and intent of this invention by placing controlled atomized droplet spray units close to target foliage or crop in agricultural application for minimizing spray material waste, shorten the distance atomized droplets have to travel to reach their intended targets, and provide a mounting platform from which the spray units may be articulated to aim at any direction to accommodate various plant profiles; specially configured booms are needed to accomplish this end.

Figure 12:
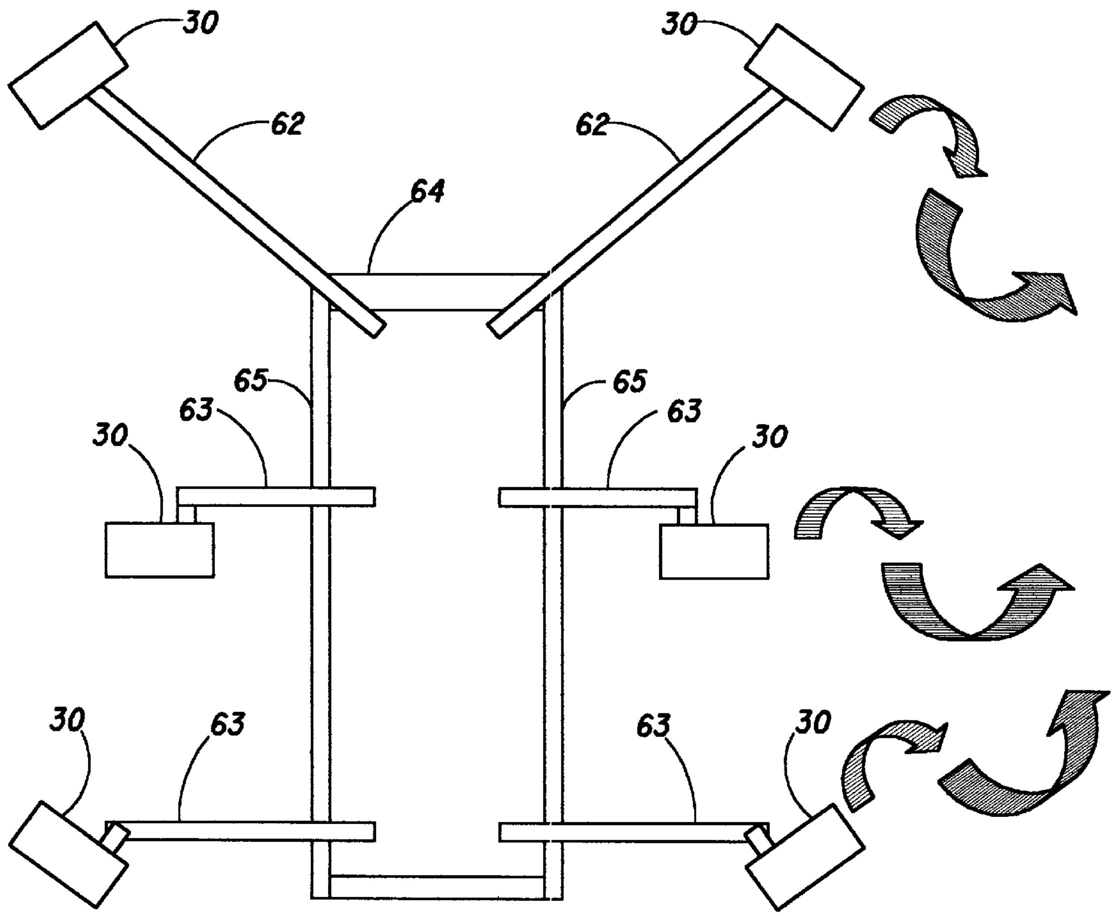
FIG. 12 is a rear elevation schematic diagram of a trellised crop (such as grapes, and berries) sprayer boom featuring height adjustable extendable arms and extension arms that can be articulated on which plural spray units are mounted and can be articulated to aim the spray at any angle.

FIG. 12 is schematic diagram showing a boom suitable for spraying trellised grape and berry crops. This boom consists of a main frame 64 with vertical elements 65. Extendable and retractable extension arms 62, 63 are attached to vertical elements 65, and cam be raised and lowered. Extension arms 62 may also be set at any angle relative to the vertical elements 65. Spray units 30 are mounted at the end of each extension arm 63 and may be articulated to project controlled atomized droplets at any angle as illustrated by arrows in FIG. 12. The purpose of extendibility of laterally oriented arms is to accommodate variation in width between crop rows. In normal practice this boom 64 is attached to a platform such as a trailer or three-point hitch on which the spray material reservoir associated plumbing, conduits and controls are located.

Figure 13:
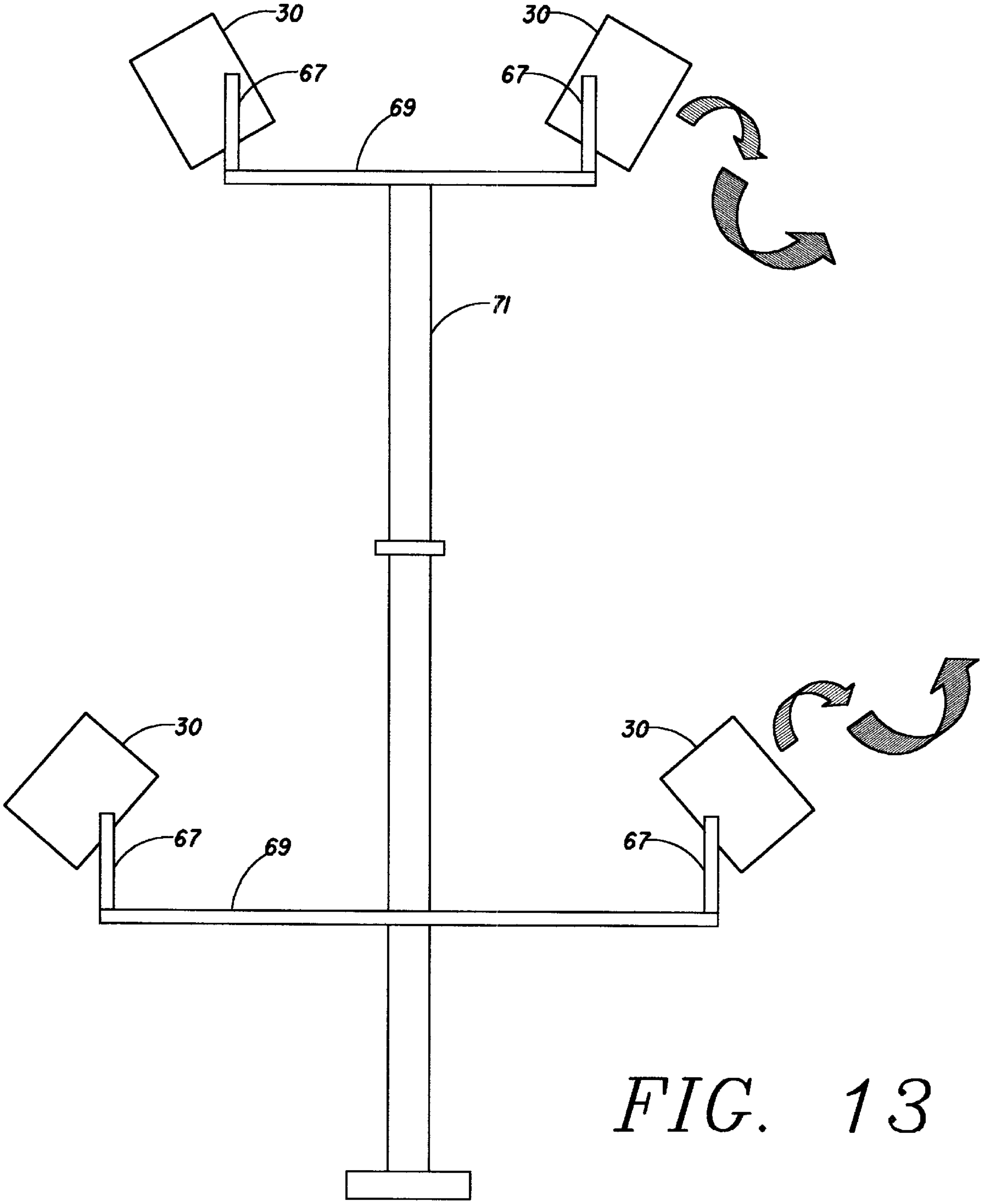
FIG. 13 is a rear elevation schematic diagram of an orchard boom featuring eight and laterally adjustable extension arms mounted on a two-section vertical column. The diagram also depicts the manner plural spray units such as that described in FIG. 3 and 4 or clusters of spray units as described in FIG. 1, 1*a*, and 2 are mounted to give maximum spray coverage to tall orchard trees with various plant profile.

For tall plants such as those existing in an orchard, a typical orchard boom is depicted in FIG. 13. This boom consists of a single vertical column 71 on which lateral extendible arms 69 are attached. Like the boom previously described in FIG. 12 these lateral extension arms may be raised or lowered vertically and extended laterally. Spray units 30, whether singly or in clusters are mounted at the end of these extension arms 69 and articulated to project spray at any angle and direction. This orchard boom assembly is mounted on platform previously described.

Figure 14:
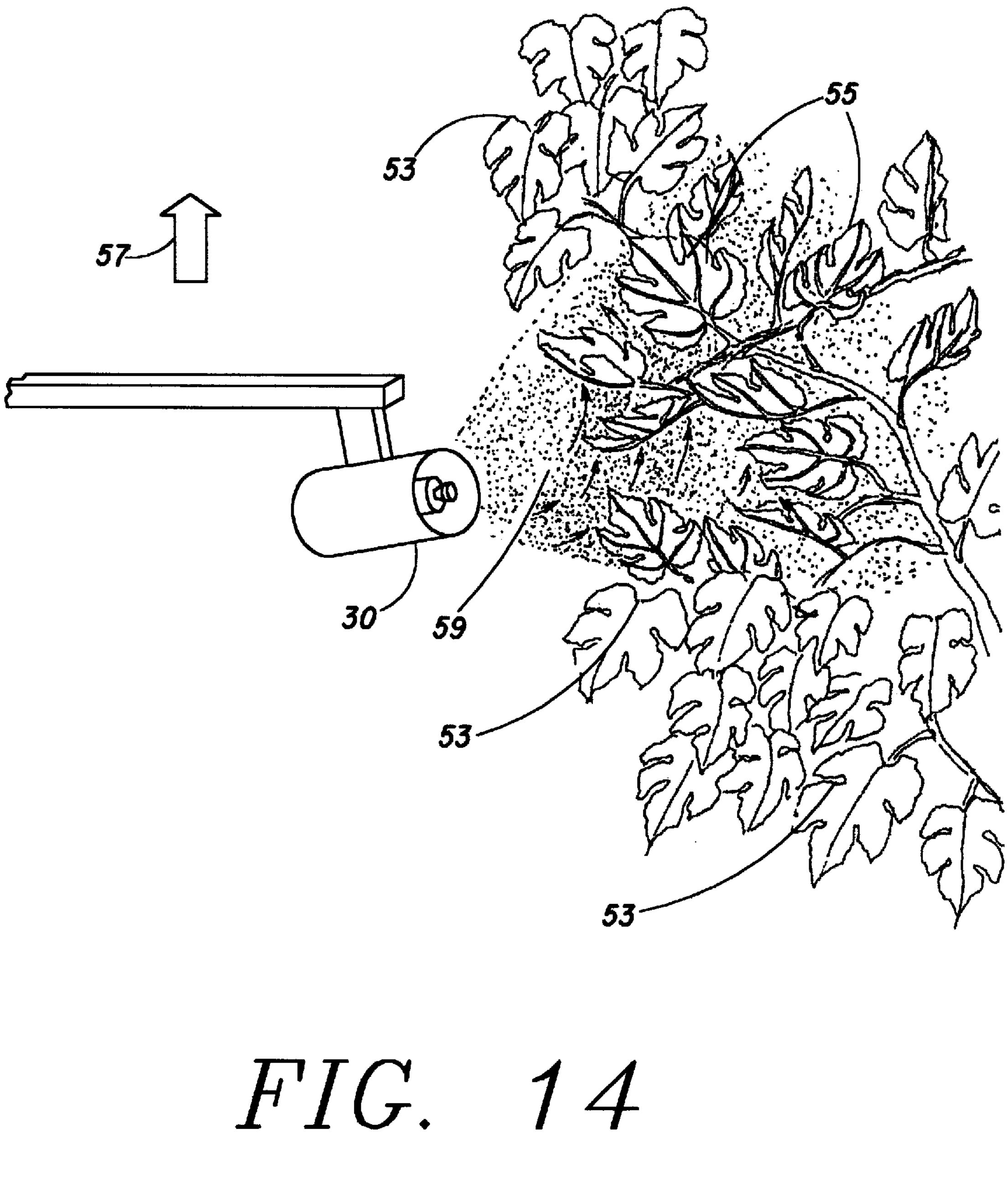
FIG. 14 is a graphic drawing depicting a moving spray module in operation and the (effect of spiraling airflow and spray droplets moving plant leaves from their natural positions so they are covered by spray on all surfaces.

FIG. 14 illustrates a single atomizer blower module 30 mounted on a boom arm close to the plants being sprayed while the sprayer is moving in a forward direction 57. The spiraling airflow and spray 59 (direction of travel indicated by arrows) serve to lift and turn the leaves 55 exposing the undersides (leaf veins showing as with under sides of leaves) to be covered by droplets. In contrast, the leaves 53 not being sprayed remain in their natural orientation, as shown in FIG. 14.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teachings.

The present invention has been described above in conjunction with the preferred environment of agricultural or horticultural applications. However, it should be understood that the present application has applications in other areas as well. For example, the present invention could have applications for paint, chemical or water deposition on regular or irregular large spray surface areas. Examples are: painting larger buildings, decks, etc; waterproofing concrete surfaces; and control moisture for proper curing of structural concrete.

Also, the present invention could have applications for spraying on a spray surface for structural pest control.

In addition, the present invention could have applications for outdoor temperature and humidity control. Examples could include: misting in malls and public places (California central valley, Nevada, New Mexico, Arizona, Saudi Arabia, etc.); gardens and patios; and cooling football and baseball player benches and dugouts. Still further applications of the present invention could be fire fighting, suppression, and prevention. One example of fire prevention is the application to oscillating spray modules (Los Angeles hill residences, Oakland hills, etc.).

Still further, it should be appreciated that the present invention can produce different sized atomized droplets and control the projection and direction of those droplets accordingly for spraying on a spray surface. For example, a 50 micron diameter droplet is preferred for agricultural spraying. Fog size droplets could be suitable for greenhouse application purposes. Other droplet sizes could be suitable for the different applications described above.

The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus for producing atomized droplets for agricultural or horticultural purposes comprising:

means for producing controlled atomization droplets, including spinning cone means, air blower means for forming a fluid film on the spinning cone means and for moving the fluid film forward on the spinning cone means to produce a force vector tangential to the rotating axis of the spinning cone means, the spinning cone means shearing the fluid film into the atomization droplets, and the air blower means controlling projection of the atomization droplets in the same general direction for spraying on agricultural or horticultural spray surfaces.

2. The apparatus as in claim 1 including means for producing uniform sized atomized droplets controllable from fog size or larger for spraying to the spray surfaces.

3. The apparatus as in claim 2 including means for generating a laminar airflow in a vortex or cyclone pattern functioning to project and distribute the spray droplets evenly and more completely on the sprayed surfaces such that the resulting vortex or cyclone spray and airflow serves to lift, turn, and flutter plant leaves on the spray surfaces, exposing all sides to be coated with the spray droplets.

4. The apparatus as in claim 3 including means for providing an integrated system of airflow generated by an axial fan, a rotary cone shaped atomizer and two or more sets of multi-layer air channels which interact to perform functions of droplet atomization, modifying droplet travel direction, and attenuate droplet acceleration resulting in a controlled vortex or spiral pattern of atomized droplets and airflow.

5. The apparatus as in claim 4 including a fan motor and means for providing the fan motor and atomizer with electrical power to form the basis for a lightweight spray module.

6. The apparatus as in claim 5 including multiple modules mounted on booms.

7. The apparatus as in claim 6 including means for placing the sprayer module very close to the spray surfaces of the plants reducing significantly the distance droplets must travel to reach intended spray surfaces to make possible large reduction of power requirement and size of the blower or fan allowing for far greater number of droplets to reach the intended spray surface target providing more complete spray coverage with minimum loss of spray chemicals to the environment.

8. The apparatus as in claim 7 including means for using laminar airflow (unidirectional travelling of all air molecules) that provides a force vector to move the droplets forward, imparting kinetic energy to accelerate the droplets in a predictable direction, and provide a controlled airflow and spray pattern for deposition of atomized droplets to all surfaces of the spray surfaces such as plant leaves.

9. An apparatus for producing atomized droplets for spraying on a spray surface comprising:

means for producing controlled atomization droplets and for projecting the droplets in the same general direction, including spinning cone means, air blower means for forming a fluid film on the spinning cone means and for moving the fluid film forward on the spinning cone means to produce a force vector tangential to the rotating axis of the spinning cone means, the spinning cone means shearing the fluid film into the atomization droplets, and the air blower means controlling projection of the atomization droplets in the same general direction for :praying on agricultural or horticultural spray surfaces.

10. The apparatus as in claim 9 including means for generating a laminar airflow in a vortex or cyclone pattern functioning to project and distribute the spray droplets evenly and more completely on the spray surface.

11. The apparatus as in claim 10 including means for using laminar airflow (unidirectional travelling of all air molecules) that provides a force vector to move the droplets forward, imparting kinetic energy to accelerate the droplets in a predictable direction, and provide a controlled airflow and spray pattern for deposition of atomized droplets to all surfaces of the spray surface.

12. In an apparatus for producing atomized droplets for agricultural or horticultural purposes, the apparatus including spinning cone means and air blower means, the method comprising:

producing controlled atomization droplets forming a fluid film on the spinning cone means and for moving the fluid film forward on the spinning cone means to produce a force vector tangential to the rotating axis of the spinning cone means, shearing the fluid film into the atomization droplets, and controlling projection of the atomization droplets in the same general direction for spraying on agricultural or horticultural spray surfaces.

* * * * *